UNITED STATES PATENT OFFICE 2,556,665

PLANT GROWTH REGULANTS AND PHYTOCIDES

Allen E. Smith, Beacon Falls, Conn., and Otto L. Hoffmann, Ames, Iowa, assignors to United States Rubber Company, New York, N. Y., a corporation of New Jersey No Drawing. Application March 18, 1950, Serial No. 150,552

17 Claims. (Cl. 71—2.6)

This invention relates to plant growth regulants and phytocides.

We have found that N-aryl phthalamic acids are effective plant growth regulants and phytocides. Typical growth regulatory responses include the prevention of fruit drop, rooting of cuttings, formation of parthenogenetic (seedless) fruit, altering leaf shape. The chemicals of the present invention are particularly useful in the formation of seedless fruit. They can be sprayed on the whole plant at concentrations which induce fruit set but cause no injury. At higher concentrations, the chemicals of the present invention are phytocidal, and may be used to kill or seriously injure unwanted plants. Such phytocidal activity of the chemicals is also considered to be a plant growth regulating effect.

The N-aryl phthalamic acids are readily prepared by reacting phthalic anhydride with the selected primary or secondary monoaryl amine according to the following reaction:

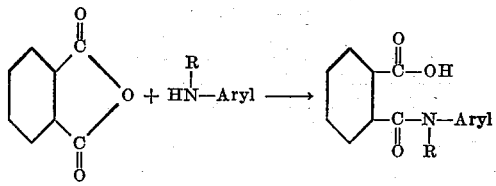

where R is hydrogen, or an alkyl radical, e. g. methyl, ethyl, n-propyl, isopropyl, n-butyl, isobutyl, sec-butyl, amyl, hexyl, octyl. Equimolar amounts of phthalic anhydride and the selected primary or secondary monoaryl amine are stirred together in a solvent such as benzene, xylene, or kerosene. The reaction takes place rapidly at room temperature, giving the N-aryl phthalamic acid. At higher temperatures, such as 80 to 180° C., the N-aryl phthalamic acid loses water to form the N-aryl phthalamide. The aryl group may be a phenyl or naphthyl group, which may be substituted, as haloaryl, nitroaryl, alkylaryl, or hydroxyaryl, e. g. o-chlorophenyl, m-chlorophenyl, p-chlorophenyl, 2,4-dichlorophenyl, 2,5-dichlorophenyl, 2,4,5-trichlorophenyl, 2-methyl-4-chlorophenyl, 2-bromophenyl, 4-bromophenyl, 2,4,5-tribromophenyl, o-nitrophenyl, m-nitrophenyl, p-nitrophenyl, 2-methyl-4-nitrophenyl, 2-chloro-4-nitrophenyl, o-hydroxyphenyl, m-hydroxyphenyl, p-hydroxyphenyl, 2-chloro-4-hydroxyphenyl, o-tolyl, m-tolyl, p-tolyl, alpha-naphthyl, beta-naphthyl. The N-aryl-phthalamic acids may be used as plant growth regulators and phytocides or herbicides in the form of the free acids; or their esters, e. g. methyl, ethyl, propyl, or butyl esters; or their salts such as the alkali (i. e. alkali-metal, ammonium and amine) salts, e. g. sodium, potassium, ammonium, methyl ammonium, dimethyl ammonium, trimethyl ammonium, ethyl ammonium, ethanol ammonium, diethanol ammonium, or triethanol ammonium salts of the N-aryl phthalamic acids, since the esters and salts give equivalent results.

The N-aryl phthalamic acids may be applied to the plants in an inert medium, such as a dust in admixture with a powdered solid carrier, such as the various mineral silicates, e. g. mica, talc, pyrophyllite and clays, or as an aqueous spray. The effect of the chemicals of the present invention on plants at various concentrations of the chemicals will vary with the chemical, with the formulation, with the time of year, with the age, species and variety of plant, with the climatic conditions, season, weather, etc. We can make the following broad generalizations as to the effect of concentrations of the chemicals of the present invention: Growth regulator effects are pronounced at concentrations up to 1,000 (from as low as 0.1) parts per million (P. P. M.) in aqueous suspension; both phytocidal or herbicidal effects and growth regulation effects are evident in the 1,000–2,000 P. P. M. range, while phytocidal or herbicidal effects become pronounced above 2,000 P. P. M. (to 1% concentration and above). The chemicals of the invention are also preferably used in admixture with small amounts of a surface-active dispersing agent which may be anionic surface-active agent, a non-ionic surface-active agent, or a cationic surface-active agent. Such surface-active dispersing agents help to disperse the N-aryl phthalamic acids in water for sprays and also act as wetting agents. The N-aryl phthalamic acids may also be admixed with powdered solid carriers, such as mineral silicates, together with a small amount of such a surface-active dispersing agent so that a readily wettable powder may be obtained which may be applied directly to plants, or which may be shaken up with water, to readily prepare a suspension of the chemical (and powdered carrier) in water for application to plants in that form.

The anionic surface-active agents that may be used in the present growth regulant compositions are those having a general formula selected from the group consisting of R—COOM, R—SO$_3$M, where M represents alkali-metal, ammonium or substituted ammonium (amine) radical, and R represents an organic radical containing at least one group having more than 8 carbon atoms.

Examples of such anionic surface-active agents are:

(1) Soaps (e. g. sodium laurate, ammonium stearate, diethanol ammonium oleate).

(2) Alkyl sulfonates (e. g. dodecyl sodium sulfonate, cetyl potassium sulfonate).

(3) Alkyl sulfates (e. g. sodium dodecyl sulfate, sodium oleyl sulfate).

(4) Sulfonated ethers of long and short chain aliphatic groups (e. g. $C_{17}H_{33}$—O—$C_2H_4SO_3$—Na).

(5) Sulfated ethers of long and short chain aliphatic groups (e. g. $C_{17}H_{33}$—O—$C_2H_4$—O—$SO_3Na$)

(6) Sulfonated alkyl esters of long chain fatty acids (e. g. $C_{17}H_{33}-\overset{O}{\underset{\|}{C}}-O-C_2H_4-SO_3Na$)

(7) Sulfonated glycol esters of long chain fatty acids (e. g. $C_{17}H_{33}-\overset{O}{\underset{\|}{C}}-O-C_2H_4-O-SO_3Na$)

(8) Sulfonated alkyl substituted amides of long chain fatty acids (e. g. $C_{17}H_{33}-\overset{O}{\underset{\|}{C}}-NH-C_2H_4-SO_3Na$; $C_{17}H_{33}-\overset{O}{\underset{\|}{C}}-\overset{CH_3}{\underset{|}{N}}-C_2H_4-SO_3Na$)

(9) Alkylated aryl sulfonates (e. g. isopropyl naphthalene sodium sulfonate, dodecyl benzene sodium sulfonate).

(10) Hydroaromatic sulfonates (e. g. tetrahydro-naphthalene sodium sulfonate).

(11) Alkyl sulfosuccinates (e. g. dioctyl sodium sulfo-succinate).

(12) Aryl sulfonate-formaldehyde condensation product (e. g. condensation product of formaldehyde and sodium naphthalene sulfonate,

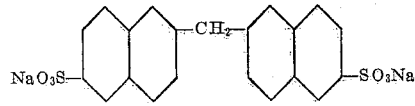

Non-ionic surface-active agents that may be used in the present growth regulant compositions are:

(1) Polyether alcohols, such as reaction products of ethylene oxide or polyethylene glycol with a long chain fatty alcohol (e. g. reaction product of ethylene oxide and oleyl alcohol, viz:

$C_{17}H_{33}$—$(OC_2H_4)_nOH$ where $n$ is 10 to 20.

(2) Polyglycol esters, such as reaction products of ethylene oxide or polyethylene glycol with a long chain fatty acid (e. g. reaction product of ethylene oxide or polyetheylene glycol with oleic acid, viz:

where $n$ is 10 to 20).

(3) Partial esters of polyhydric alcohols with long chain fatty acids (e. g. diethylene glycol monolaurate, sorbitan trioleate).

Cationic surface-active agents that may be used in the present growth regulant compositions are:

(1) Quaternary ammonium salts in which one of the groups attached to the nitrogen has an aliphatic group having at least 8 carbon atoms (e. g. trimethyl cetyl ammonium iodide, lauryl pyridinium chloride, cetyl dimethyl benzyl ammonium chloride, N-stearyl betaine).

(2) Amines, amides, diamines and glyoxalidines having an aliphatic group containing at least 8 carbon atoms and their acid esters (e. g. stearylamine hydrochloride, oleyl amide, diethylethylene oleyl diamine, 2-heptadecyl N-hydroxyethyl glyoxalidine).

The following examples are given to illustrate the invention:

*Example I*

Several N-phenyl phthalamic acids were dispersed in water at concentrations of 2000 parts per million (P. P. M.) using one drop per 100 milligrams of the chemical of a commercial surface-active dispersing agent (reaction product of ethylene oxide and ricinoleic acid) known to be non-toxic to the plants under test, which acted as a dispersing agent for the chemicals. The suspensions of the chemicals were sprayed on the blossoms of male sterile tomato plants in the greenhouse. No pollination was possible, so any fruit development must have been caused by the chemical. N-(m-nitrophenyl) phthalamic acid, N-(p-nitrophenyl) phthalamic acid, N-(2-methyl-4-chlorophenyl) phthalamic acid, N-(n-octyl) N-(p-chlorophenyl) phthalamic acid, N-methyl N-(alpha-naphthyl) phthalamic acid and N-(beta-naphthyl) phthalamic acid caused fruit development.

*Example II*

Young tomato plants were sprayed with an aqueous suspension containing 500 P. P. M. of N-(p-chlorophenyl) phthalamic acid and the same ratio of the dispersing agent used in Example I. Other young tomato plants were sprayed with aqueous solutions containing 500 P. P. M., 1,000 P. P. M. and 2,000 P. P. M. of N-(p-chlorophenyl) phthalamic acid as the triethanol ammonium salt. Although the plants appeared to have no blossoms at the time of spraying, the plants subsequently developed parthenocarpic fruit.

*Example III*

Bonnie Best tomato plants were set out in the field in four foot squares. Aqueous suspensions of various chemicals of the present invention at 2,000 P. P. M. were made up with the same ratio of the surface-active dispersing agent used in the previous examples. Lower concentrations of the various chemicals to 20 P. P. M. were made up from this concentration by dilution with water. Some plants were sprayed with 100 c. c. of the suspension of a given chemical at a given concentration when they had one to three unset blossoms. Other plants were similarly sprayed later with 200 c. c. of the suspension of the given chemical when they had three to eight blossom clusters.

Observations were taken when it could be determined if seedless fruit had developed or other distinguishing characteristics of chemically set fruit, such as enlargement of the fruit stem and sepals, and retention of the petals, had developed.

Seedless fruit developed or other indications of chemical fruit set as discussed above, were apparent in the various plants sprayed with concentrations from 20 P. P. M. to 2000 P. P. M. of N-phenyl phthalamic acid, N-(o-chlorophenyl) phthalamic acid, N-(m-chlorophenyl) phthalamic acid, N-(p-chlorophenyl) phthalamic acid, N-(2,5-dichlorophenyl) phthalamic acid, N-(2,4,5-trichlorophenyl) phthalamic acid, N-(p-bromophenyl) phthalamic acid, N-(o-nitrophenyl) phthalamic acid, N-(m-nitrophenyl) phthalamic acid, N-(p-nitrophenyl) phthalamic acid, N-(o- acid, N-(p-tolyl) phthalamic acid, and N-(alpha-tolyl) phthalamic acid, N-(m-tolyl) phthalamic naphthyl) phthalamic acid.

Example IV

Many known growth regulating chemicals cause a characteristic formative effect on plants, such as altering the shape of the leaves as on tomato plants, and in general such effects have been disadvantageous to the plants since they cause a pathological deformation of the plant by reducing the photo-synthetic area of the leaf by narrowing the same, as in the so-called strap leaf response. When the chemicals of the present invention are used in concentrations to cause a formative effect, such formative effect is accompanied not by a narrowing but by a broadening of the leaf, so that the photosynthetic area of the leaf is not diminished. The growth regulating chemicals of the present invention do not induce the damaging abnormal cell proliferation which characterizes the activity of many other growth regulating chemicals.

Small (six inch) tomato plants were sprayed until the spray liquid ran freely from the foliage with aqueous suspensions of various chemicals of the present invention at concentrations of 2.5 to 2000 P. P. M. prepared with the same ratio of the surface-active dispersing agent used in the previous examples. After one to two weeks, observations showed formative effects but without reduction of the photosynthetic area of the leaf in the case of N-(phenyl) phthalamic acid, N-(o-chlorophenyl) phthalamic acid, N-(m-chlorophenyl) phthalamic acid, N-(p-chlorophenyl) phthalamic acid, N-(2,5-dichlorophenyl) phthalamic acid, N-(2,4,5-trichlorophenyl) phthalamic acid, N-(p-bromophenyl) phthalamic acid, N-(o-nitrophenyl) phthalamic acid, N-(m-nitrophenyl) phthalamic acid, N-(p-nitrophenyl) phthalamic acid, N-(o-tolyl) phthalamic acid, N-(m-tolyl) phthalamic acid, N-(p-tolyl) phthalamic acid, N-(2-methyl-4-chlorophenyl) phthalamic acid, N-(2-methyl-4-nitrophenyl) phthalamic acid, N-methyl N-(p-chlorophenyl) phthalamic acid, N-(n-octyl) N-(p-chlorophenyl) phthalamic acid and N-methyl N-(alpha-naphthyl) phthalamic acid.

Example V

Young tomato plants were sprayed until the spray liquid ran freely from the foliage with aqueous suspensions of various chemicals of the present invention at concentrations of 2000 P. P. M. prepared with small amounts of the surface-active dispersing agent used in the previous examples. After one to two weeks the plants were examined for injury. The percentage of dead leaves was used as a measure of phytotoxicity.

N-(o-chlorophenyl) phthalamic acid, N-(o-nitrophenyl) phthalamic acid, N-(2-methyl-4-chlorophenyl) phthalamic acid, and N-(n-octyl) N-(p-chlorophenyl) phthalamic acid caused 5% to 50% dead leaves. N-(alpha-naphthyl) phthalamic acid, N-(2,5-dichlorophenyl) phthalamic acid, N-(p-nitrophenyl) phthalamic acid, and N-methyl N-(p-chlorophenyl) phthalamic acid caused 50% to 99% dead leaves. N-(p-chlorophenyl) phthalamic acid and N-(p-bromophenyl) phthalamic acid caused 50% to complete defoliation of the plants and killed the plants.

This is a continuation-in-part of our application Serial No. 78,004, filed February 23, 1949, now abandoned.

Having thus described our invention, what we claim and desire to protect by Letters Patent is:

1. A plant growth regulant and phytocidal composition comprising an N-aryl phthalamic acid and a surface-active dispersing agent.

2. A plant growth regulant and phytocidal composition comprising material selected from the group consisting of N-aryl phthalamic acids and their salts and esters, and a surface-active dispersing agent.

3. A plant growth regulant and phytocidal composition comprising an aqueous suspension of an N-aryl phthalamic acid, said aqueous suspension containing a surface-active dispersing agent.

4. A plant growth regulant and phytocidal composition comprising an aqueous suspension of material selected from the group consisting of N-aryl phthalamic acids and their salts and esters, said aqueous suspension containing a surface-active dispersing agent.

5. A plant growth regulant and phytocidal composition comprising an N-aryl phthalamic acid, a powdered solid carrier and a surface-active dispersing agent.

6. A plant growth regulant and phytocidal composition comprising material selected from the group consisting of N-aryl phthalamic acids and their salts and esters, a powdered solid carrier and a surface-active dispersing agent.

7. A plant growth regulant and phytocidal composition comprising an N-aryl phthalamic acid, a powdered mineral silicate and a surface-active dispersing agent.

8. A plant growth regulant and phytocidal composition comprising material selected from the group consisting of N-aryl phthalamic acids and their salts and esters, a powdered mineral silicate and a surface-active dispersing agent.

9. A plant growth regulant and phytocidal composition comprising an N-aryl phthalamic acid and a powdered mineral silicate.

10. A plant growth regulant and phytocidal composition comprising material selected from the group consisting of N-aryl phthalamic acids and their salts and esters, and a powdered mineral silicate.

11. A plant growth regulant and phytocidal composition comprising N-(p-chlorophenyl) phthalamic acid and a surface-active dispersing agent.

12. A plant growth regulant composition comprising N-(p-chlorophenyl) phthalamic acid, a powdered solid carrier and a surface-active dispersing agent.

13. A plant growth regulant composition comprising N-(p-chlorophenyl) phthalamic acid and a powdered mineral silicate.

14. The method of altering the growth characteristics of growing plants which comprises treating growing plants with an N-aryl phthalamic acid in concentration and amount sufficient to alter the growth characteristics of said plants.

15. The method of altering the growth characteristics of growing plants which comprises treating growing plants with material selected from the group consisting of N-aryl phthalamic acids and their salts and esters in a concentration and amount sufficient to alter the growth characteristics of said plants.

16. The method of forming seedless fruit on plants which comprises applying to plants before fertilization an N-aryl phthalamic acid in a concentration and amount sufficient to form seedless fruit on said plants.

17. The method of forming seedless fruit on plants which comprises applying to plants before fertilization material selected from the group consisting of N-aryl phthalamic acids and their salts and esters in a concentration and amount sufficient to form seedless fruit on said plants.

ALLEN E. SMITH.
OTTO L. HOFFMANN.

REFERENCES CITED

The following references are of record in the file of this patent:

Beilstein, Handbuch de Organische Chemie, 4th ed., vol. 12 (1929), page 614.